US005455295A

United States Patent [19]
Bearden et al.

[11] Patent Number: 5,455,295
[45] Date of Patent: Oct. 3, 1995

[54] ALL WEATHER RACETRACK COMPOSITION

[75] Inventors: Charles R. Bearden, West Columbia; Sherman Kottle, Lake Jackson, both of Tex.

[73] Assignee: Fastrac Systems, Inc., West Columbia, Tex.

[21] Appl. No.: 775,822

[22] Filed: Oct. 11, 1991

Related U.S. Application Data

[63] Continuation-in-part of Ser. No. 753,720, Sep. 3, 1991, abandoned, which is a continuation-in-part of Ser. No. 711,930, Jun. 7, 1991, abandoned, which is a continuation-in-part of Ser. No. 445,009, Dec. 4, 1989, abandoned.

[51] Int. Cl.$^6$ .................................... A63K 1/00
[52] U.S. Cl. .................. 524/445; 524/514; 524/524; 524/525
[58] Field of Search .................. 524/524, 445, 524/514, 525; 272/5

[56] References Cited

U.S. PATENT DOCUMENTS

| | | | |
|---|---|---|---|
| 4,303,571 | 12/1981 | Jansen et al. | 525/211 |
| 4,379,190 | 4/1983 | Schenck | 428/95 |
| 4,598,019 | 7/1986 | Yokoyama | 428/407 |
| 4,792,133 | 12/1988 | Hawkins et al. | 428/404 |
| 4,852,870 | 8/1989 | Hawkins et al. | |
| 4,968,024 | 11/1990 | Hawkins et al. | |

FOREIGN PATENT DOCUMENTS

| | | | |
|---|---|---|---|
| 53-74723 | 7/1978 | Japan | 272/3 |
| 53-43550 | 11/1978 | Japan | 524/524 |
| 57-58705 | 4/1982 | Japan | |

OTHER PUBLICATIONS

Sellnow, L., "The Race for Safety", *The Blood–Horse of Mar. 25, 1989.*

Primary Examiner—Thurman K. Page
Assistant Examiner—P. Kulkosky
Attorney, Agent, or Firm—Christensen O'Connor Johnson & Kindness

[57] ABSTRACT

A racetrack surface composition including a synthetic polymer component, a hydrocarbon oil fluid between 25°–90° F., and a particulate material such as sand. The synthetic polymer component is preferably either an elastomer, or an elastomer in combination with non-elastomeric polymer; or generally a mixture of oil soluble and oil dispersible polymer which together with the oil form a binder for the particulates. The racetrack composition readily forms a pad and the cushion portion does not clump or compact but maintains its granular, rakeable quality even at track temperatures above about 130° F. The composition is not adversely affected by wet weather. The invention further includes the addition of carbon black to the racetrack composition in order to improve weatherability. In the event that the racetrack composition is not readily rakeable, the invention teaches the post addition of a rakeability promoter to improve rakeability.

19 Claims, 4 Drawing Sheets

ALL WEATHER RACETRACK COMPOSITION

RELATED APPLICATIONS

This application is a continuation-in-part of U.S. Ser. No. 07/753,720, filed on Sep. 3, 1991 now abandoned which is a continuation-in-part of U.S. Ser. No. 07/711,930, filed Jun. 7, 1991 now abandoned which is in turn a continuation in part of U.S. Ser. No. 07/445,009, filed Dec. 4, 1989, now abandoned.

BACKGROUND OF THE INVENTION

1. Field of the Invention

This invention relates to a composition useful as an all-weather surface material for racetracks, especially horse racetracks.

2. Background

Currently, most horse racetracks are covered with a clay surface and are commonly referred to as "dirt" tracks. Recent studies at the Massachusetts Institute of Technology has reported an article in *The Blood-Horse* of Mar. 25, 1989, pp. 1704–08 entitled "The Race for Safety," have shown that the risk of injury to a racehorse is directly related to the degree of compaction of the surface upon which it is being raced and the amount of force brought to bear upon the horse's front legs. Dr. Pratt, who carried out this research, explained that during use ordinary dirt tracks undergo a great deal of compaction under the action of horses' hooves. This compaction is greatest on the track area immediately beneath the horse's hooves. Consequently, the track develops areas of high compaction and areas of lesser compaction. When running at speed, therefore, the bones of the horse's legs could experience very different load factors depending upon the area of the track upon which the hoof impacts. The study indicates that uneven loading of a horse's leg bones is a key factor in fatigue with consequent fracture when the maximum level of fatigue endurance is exceeded.

In order to improve "dirt" track conditions, Dr. Pratt indicates that the moisture content of the track should be kept within a window of about 7–11% water. The ordinary water truck used at racetracks to moisten the track increases track moisture by about 0.3 of one percent per pass. Thus, on a hot, dry day, the loss of water due to evaporation may not be replenished adequately by use of a water truck.

Racetrack surface materials using synthetic binders offer the potential for producing a surface more resilient than a "dirt" track. However, thus far efforts in this direction have not produced altogether successful results. For example, the commercially available product, EQUITRACK, sold by En tout cas has significant disadvantages. Racetracks typically include a base layer or "pad" which is a compacted base 2–4 inches thick covered by a "cushion" of looser, granular material which is about 2 inches thick. At the track installation stage, the base or "pad" based on the EQUITRACK material is not easily formed when ambient temperatures rise to typically encountered Summer daytime temperatures, ambient temperatures above about 80° F. Under these conditions, the EQUITRACK material loosens and softens and cannot be easily formed into the desired compacted pad. Further, the track material requires a settling-in period of several months during which the pad has to be regularly worked until it is established. Finally, the EQUITRACK composition, which tends to become sticky in direct sunlight, forms clumps when it cools creating "false pads." These clumps prevent effective raking to form a proper cushion and also fouls maintenance equipment.

There yet exists a need for a racetrack surface composition that provides ease of installation, does not require long periods of time to establish a pad, provides a suitable, resilient cushion and that is readily rakeable and easily maintained.

SUMMARY OF THE INVENTION

The invention is a composition suitable for use as a racetrack surface material, especially a horse racetrack surface material. The invention composition is easily installed, not requiring long periods of time to establish the pad. Further, the surface or cushion material does not become sticky or tend to form clumps in hot weather and is easily maintained by raking. The invention composition also provides a suitably resilient surface for horse racing.

The invention racetrack composition comprises a binder and a natural particulate material, such as sand. The binder comprises a synthetic polymeric component and a hydrocarbon composition.

In one embodiment, the polymeric component comprises an oil soluble polymer and an oil dispersible polymer. In a second embodiment, the polymer comprises an elastomer. And, in yet another embodiment, the polymeric component is an elastomer in combination with another polymer.

The hydrocarbon composition useful in the invention are those petroleum fractions which will flow readily as a liquid at temperatures above about −20° F.

When the particulate, polymers and hydrocarbon oil are combined in appropriate proportions, they provide a racetrack cover composition which is suitable for use in all weather conditions including hot weather. Under normal conditions, solar radiation can cause racetrack surfaces to heat up to 115°–150° F. At this stage, as explained previously, prior art surfacing compositions which contain synthetic polymers become sticky and tend to form clumps and false pads. Stable pads are difficult to form due to the softening of the composition due to heat. In contrast, the invention composition, when subject to insolation even to the point of reaching a temperature in the range of 115°–150° F., will form a stable pad, will not become sticky and will therefore not form clumps or false pads under the impact of horses' hooves or the action of maintenance equipment. Consequently, the cushion of the invention track composition will maintain a rakeable quality.

It is sometimes found that when the invention binders are used and the polymeric component of the binder has a relatively high molecular weight, then although the binder-sand mixture readily forms a stable pad able to withstand the compressive stresses typically caused by driving a truck over the newly-formed pad, this binder-sand mixture may, under certain conditions, not be easily rakeable to form or maintain a cushion. To cure this rakeability problem, a 1–10 wt. % quantity of an additive may be added to improve rakeability. This rakeability additive includes the alkaline earth compounds, such as the carbonates and silicates of calcium and magnesium, and non-plastic clays such as atapulgous clay.

The invention further encompasses the addition of carbon black powder to the binder material as a shield against ultra-violet light. It has been found that the addition of carbon black improves the resistance of the racetrack composition to weather, especially ultra-violet light radiation, and produces a longer lasting composition.

DESCRIPTION OF THE PREFERRED EMBODIMENTS

Figure 1:
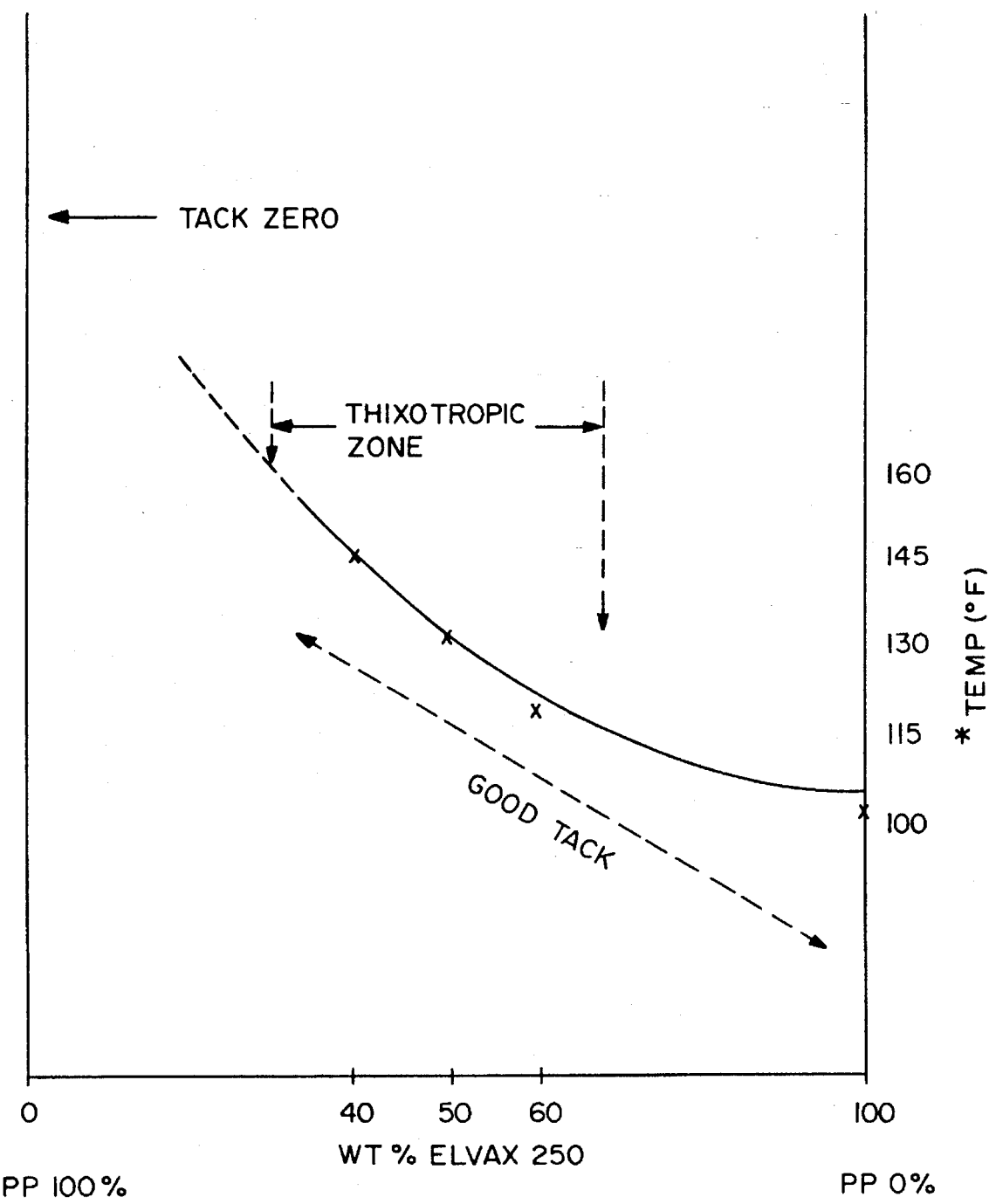
FIG. 1 is a graph showing the effect of temperature on the pour point of binders including ELVAX 250, polypropylene PD 5225 and Mobilsol® 90.

In its final form, a synthetic racetrack includes essentially two layers of the synthetic material: a pad and a cushion. A base or foundation layer of a material such as limestone or gravel is first laid down and then smoothed by rolling under pressure. In the preferred method, on top of this base layer, a layer, approximately 6 inches thick, of synthetic track material is laid down using, for instance, an asphalt laying down machine. This material is compacted into place to form a track of bulk density from about 1.4 to about 1.8. The uppermost 1½ inches of this track is then harrowed or raked to form a loose, fluffy, cushion of bulk density about 1.0 and a thickness of about 1½–2½ inches.

The invention synthetic track material is usually laid down at approximately 250° F. (121° C.). Upon cooling, this material can support loads such as the equipment used to prepare the track for use. Upon cutting the top 1–1½ inches of the 6 inch pad with a cutting harrow and fluffing the cut material, a rakeable cushion that is useful is readily obtained.

The invention racetrack surface material includes a particulate material such as sand, and a binder comprising a synthetic polymer component which may be a polymer or mixture of polymers, and a hydrocarbon oil.

The particulate material is preferably sand which generally contains particles sized from about 0.06 to about 2 mm. The particle size and characteristics of the sand vary from deposit to deposit. Typical sand, referred to as masonry sand, is most commonly used.

The petroleum or hydrocarbon oil suitable for use in the invention composition is a liquid able to flow at ambient temperatures, i.e. from about 25° to about 90° F. Useful petroleum fractions include those fractions heavier than or of higher boiling point than kerosene, i.e. gas oils. In particular, oils such as the aromatic oils sold by MOBIL as Mobilsol® 90 and 30 are especially useful.

As mentioned before, the synthetic polymer component may be a polymer or a mixture of polymers. The invention may be separated into three embodiments based upon the polymeric component.

In one embodiment, the polymeric component comprises an oil soluble polymer and an oil dispersible polymer. In a second embodiment, the polymer comprises an elastomer. And, in yet another embodiment, the polymeric component is an elastomer in combination with another polymer.

When a combination of oil soluble and oil dispersible polymers are used, the polymer-oil binder mixture is thixotropic in nature and resistant to heat breakdown, i.e., when combined with sand to form a race track surface material it is resistant to becoming sticky and clumping together so that it is stable even at temperatures as high as 125°–150° F. Typical examples of petroleum oil dispersible polymers include: Exxon's polypropylene PD5225 (MI 60), Union Carbide's ethylene ethylacrylate copolymer DPD 6169 and the like, including polymers of these types having different molecular weights. The oil soluble polymers include the ethylene vinyl acetate copolymers (EVA) having at least about 25 wt. % vinyl acetate content such as, for instance, DuPont's ELVAX 250.

In preparing the polymer-oil binder using the soluble polymer-dispersible polymer embodiment, any order of mixing may be used. For instance, one could first mix the petroleum oil with the soluble polymer and then add the dispersible polymer. In general, the petroleum oil-polymer binder produced in this embodiment includes from about 94 wt. % to about 85 wt. % petroleum oil based upon the total weight of the mixture of polymers and oil; from about 70 wt. % to 30 wt. % soluble polymer; and from about 30 wt. % to about 70 wt. % dispersible polymer, where the polymer wt. % are based upon the total weight of the polymers only. The specific ratio between these polymers depends upon the specific polymers used and may be readily determined with a few tests as shown in the examples below.

In order to produce a racetrack surfacing material the binder must be combined with a particulate material such as, for instance, sand. Useful combinations of the oil soluble-oil dispersed polymer and hydrocarbon oil binders with particulates include those combinations wherein the binder is from 3 wt. % to about 12 wt. %, preferably from 4 wt. % to 8 wt. %.

In an alternative embodiment, an elastomeric polymer is used to formulate the binder. The elastomeric polymer may be selected from the chlorinated polyethylenes such as, for instance, Dow Chemical's chlorinated polyethylene T-4211, (chlorine content 42%, melt viscosity 9000 poise), and the like. Further, the elastomeric polymer need not be one polymer but can be a blend of polymers. Thus, for example blends of higher and low molecular weight elastomers such as Dow Chemical's CPE T-3623A (36% Cl, melt viscosity 18,000 poise) and CPE T-4211 may be blended with Mobilsol® 30 to produce an excellent binder wherein the CPE T-3623A proportion is about 9 wt %, the CPE T-4211 is about 2 wt % and the Mobilsol® 30 is about 89 wt %. It being understood that the invention is not limited to these exemplary weight percentages or blends. In general, the binder composition can range from about 3 wt. % to about 15 wt. % polymer; preferably from about 7 to about 12 wt. % polymer. The hydrocarbon oil content of the binder may range from about 85 to about 97 wt. %; preferably 88 to 93 wt. %. Further, the composition useful as a racetrack surfacing material includes the binder in combination with suitable particulate material. The binder content of this surfacing material may vary from about 2.0 to about 12 wt. %; preferably from about 3 to about 6 wt. %.

In yet another embodiment, the polymer component comprises an oil soluble elastomeric polymer in combination with an oil dispersible polymer such as, for example, polypropylene. This polymer component may be blended into petroleum oil to form the binder by any mixing procedure, for example, first one polymer may be mixed with the oil, then the other may be added or a mixture of polymers may be added to the oil. The binder composition may range from 3 to 15 wt. % polymer component, preferably 7 to 12 wt. %, based upon the total weight of the binder. The proportion of elastomeric polymer may range from about 30 to about 100 wt. %, preferably from about 50 wt. % to about 90 wt. %, of the polymer component. In order to use this binder in combination with particulate material to produce a racetrack surface composition, the surface composition may usefully include from about 2.0 to about 12 wt. % binder, preferably from about 3 to about 8 wt. % binder.

When the particles of a synthetic track composition adhere so tightly to each other that the composition is not readily rakeable to form a fluffy cushion but forms clumps, then the composition is referred to as "tight." It has been found that sometimes the invention rakeable compositions described above will be tight either due to process variables or because of a deliberate effort to form a pad with high load-bearing capability. This "tightness" can be alleviated by adding from about 1 to about 10 wt. % and preferably about 3 to about 6 wt. % of an additive, based on the weight of the cushion portion. The additive, a rakeability promoter, must be substantially insoluble in water, stable at the temperatures encountered on racetracks, and relatively inexpensive.

The useful additives include a range of naturally occurring minerals that are stable at temperatures encountered on racetracks, substantially insoluble in water, and include non-plastic clays. Thus, a broad range of minerals are useful.

The useful additives include the substantially (but not necessarily completely) water insoluble alkaline earth compounds such as carbonates, silicates, sulfates, and the like, and the non-plastic clays, which usually contain aluminum magnesium silicates, such as atapulgous clay, fuller's earth, and the like. The additive, added in the low quantities specified above, causes a surprising enhancement in rakeability without significant adverse effects. While the sulfates, such as gypsum, are slowly leached from the race track composition with water, they are nevertheless useful additives. By the time the sulfate has substantially leached out, the natural weathering processes would have produced a cushion that is no longer tight but is rakeable.

The invention synthetic racetrack composition may, under ordinary conditions, be used without the need for an additive. However, in some instances, the composition is tight and an additive is necessary. While not wishing to be bound by any theory, it is speculated that a tight composition is produced as a result of the interplay of several factors. As the polymer molecular weight increases, the binder becomes more adhesive thereby creating the condition for tightness unless the binder proportion in the composition is reduced. Similarly, as the proportion of polymer in the binder increases, the binder becomes more adhesive. While these factors are easily controlled under laboratory conditions, they are not as readily controlled in a commercial, full-scale production operation.

In a production operation, the polymer and oil may, for instance, be mixed in an asphalt mixing kettle. Under these conditions, mixing is not ideal and the polymer is often subjected to temperatures for such residence times as may cause a change in its molecular weight. Thus, when this binder is mixed with sand to form a synthetic racetrack composition, the binder may be more adherent than expected so that additive addition to the racetrack composition is necessary.

Of course, since a tight composition is desirable for pad formation, it may sometimes be useful to lay down a 4 inch thick tight layer as a pad and then cover this with about 2 inches of a more rakeable composition.

It should be noted that the additive is added after the binder has been mixed with sand to form the racetrack composition, i.e., the additive is post added in a quantity sufficient to produce a rakeable composition.

While other compositions, such as mineral sands, may also reduce tightness when added to a tight composition, such sands must be added in amounts of about 20–30 wt. %. At this level of addition, the race track composition may degenerate fairly quickly into a "sandy" track which is unsuitable for good race times and which lacks the benefits of a good synthetic racetrack.

The additive is typically added in fine, powder form with typical sizes being in the 500 to 1 median micron range and preferred sizes being about 150–5 median micron size range. While not wishing to be bound to any theory, it is speculated that post-addition of the additive interferes with cohesion between binder-coated sand particles to cause fluffiness and rakeability.

Binder formulations may be modified by the addition of carbon black. The use of carbon black in the binder acts as a shield to ultra-violet light thereby improving weatherability of the synthetic racetrack composition. Typically, about 0.2 to about 2.0 wt. % of carbon black, preferably 0.3 to 0.5 wt. %, based on the total weight of the binder, is added to the molten binder slurry during binder manufacture. While larger amounts of carbon black do not appear to have a deleterious effect on properties, they cause the track material to blacken, an aesthetically undesirable effect. This carbon-black containing binder is then combined with sand in the usual manner. Suitable carbon blacks are manufactured by Sid Richardson Company such as type N55D.

The following examples serve to illustrate specific embodiments and are not intended to define the scope of the invention which is explained above and claimed below.

In the Examples, the term "pour point" refers to the temperature of incipient flow of a binder material. The pour point was measured by placing a 3–4 oz. sample of binder material in a 4-oz. jar and against this for 48 hours at room temperature. The binder was then place in an oven and the temperature increased in 10° F. increments. The sample containers were then tilted 90° and, if the material poured readily or was seen to move significantly, then this temperature was recorded as its pour point.

Further, the term "tack" refers to the adhesive-like property which is required to compact the particulate matter to form a stable pad useful as a racetrack surface composition. The tack was measured by placing a small amount of the binder between the forefinger and thumb and pressing this into a thin film. Rapid closing, separation and closing of the thumb and forefinger ("working") gives an indication of the tack characteristic. The force required to separate the fingers and the ability of the product to re-adhere determines the tack of the product. While this test is somewhat subjective, the inventor is not aware of standardized procedures for measuring this adhesive characteristic.

EXAMPLE 1

Several blends of binders were prepared with oil soluble polymer, DuPont ELVAX 250 (ethylene vinyl acetate (EVA) 28% MI 25) and an oil dispersible polymer, Exxon's polypropylene (PP) PD 5225 MI 60 in a hydrocarbon oil, Mobilsol® 90. These blends were prepared at 320°–375° F. with mixing. The binders contained 10–12 wt. % of total polymer component based on the total weight of binder. Blends were prepared with EVA:PP wt. % ratios of 0:100, 40:60, 50:50, 60:40 and 100:0. These blends were tested for pour point and the results are shown in FIG. 1. The results indicate that to achieve a pour point in excess of about 125° F., the binder should contain less than about 60 wt. % ELVAX. On the other hand, when the proportion of ELVAX is reduced to less than about 30 wt. %, the binder begins to lose tack or capability to bind particulate matter. Consequently, the optimal range of wt. % ratios of EVA:PP is from 30:70 to 50:50 for this particular composition.

EXAMPLE 2

Figure 2:
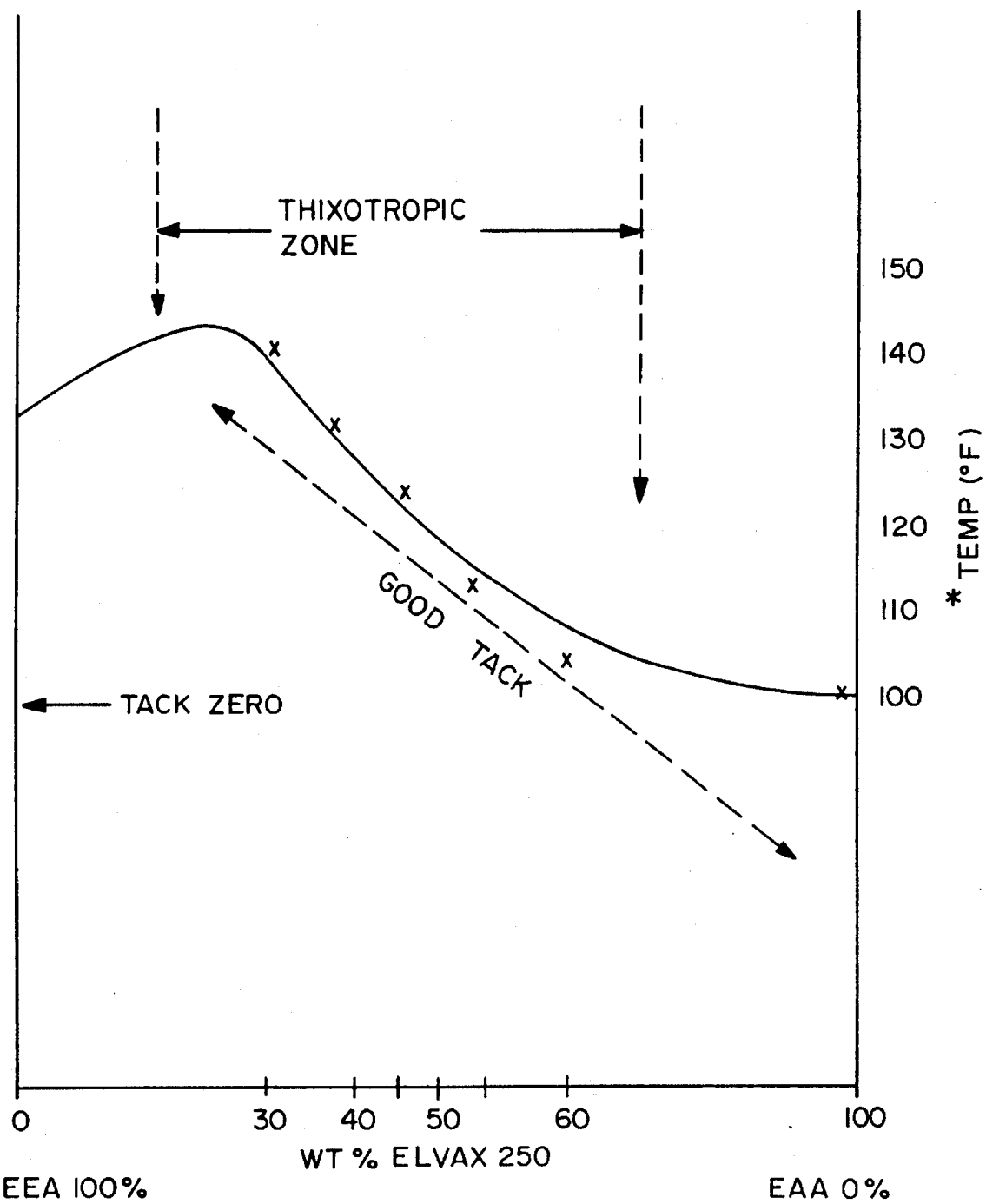
FIG. 2 is a graph showing the effect of temperature on the pour point of binders including ELVAX 250, ethylene ethylacrylate DPD 6169 and Mobilsol® 90.

A series of binder blends were prepared using Union Carbide's DPD 6169 (ethylene ethacrylate or EEA); DuPont's ELVAX 250 (ethylene vinyl acetate or EVA) and Mobilsol® 90. These binders contained 10 wt. % of total polymer component based upon the weight of the binder. Binders were prepared with EVA:EEA wt. % ratios of 100:0, 60:40, 50:50, 40:60, 30:70, 0:100. These blends were tested for pour point and tack and the results are tabulated in FIG. 2. From FIG. 2, it is apparent that to achieve a pour point of above about 130° F. the wt % EVA should be less than about 40 wt. %. However, as the wt. % EVA decreases, so does the tack of the binder. Thus, the useful range of EVA proportion is form about 20 to about 40 wt. % of the total polymer added for this composition.

EXAMPLE 3

Figure 3:
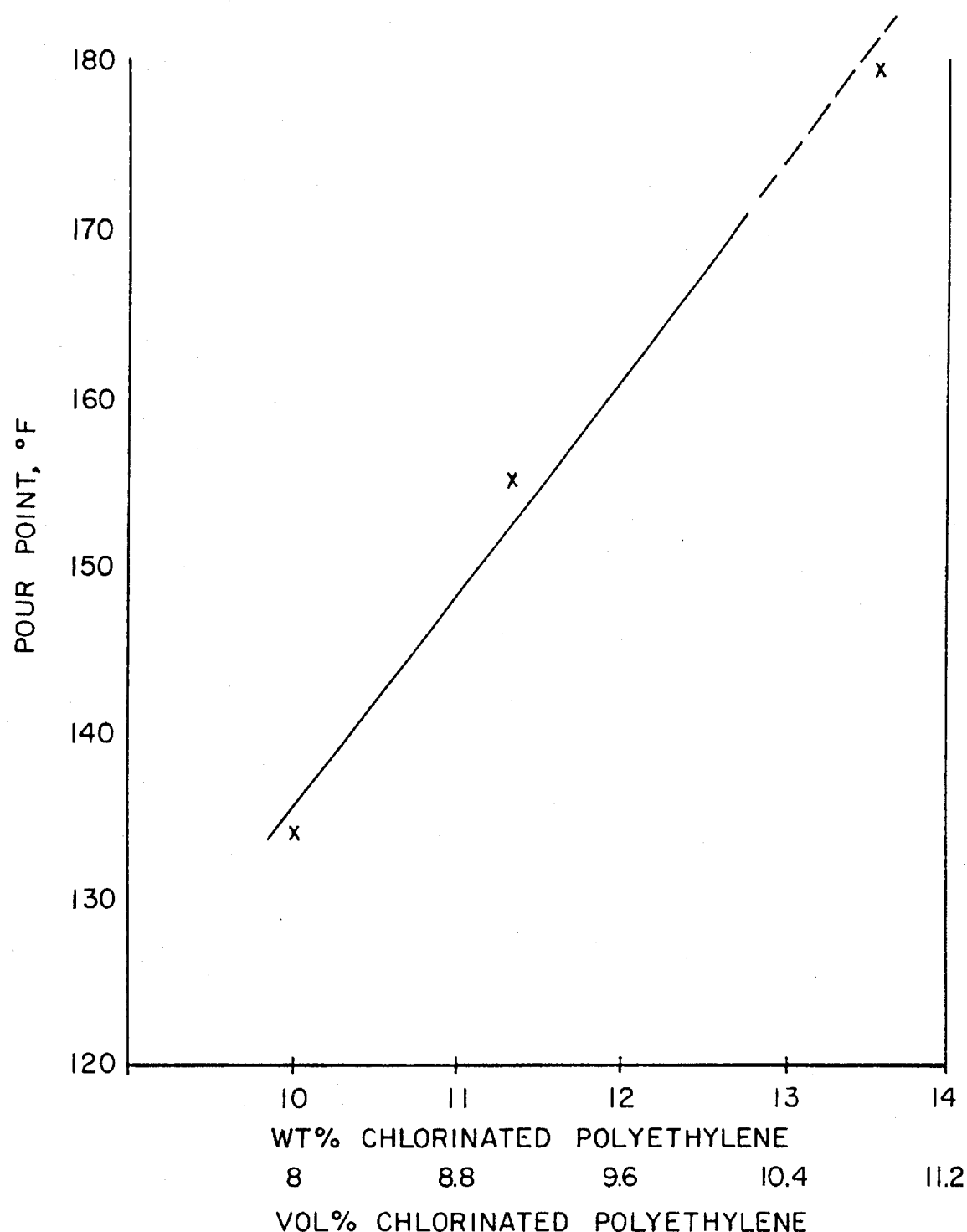
FIG. 3 is a graph showing the effect of chlorinated polyethylene content of binders on pour point. Dashed lines on the graph reflect extrapolation.

Blends were prepared with 10 wt. % of Dow Chemical's T-4211 (a chlorinated polyethylene (CPE) containing 42% chlorine) and 90 wt. % Mobilsol® 90. This blend was found to have very good tack and did not pour until heated to about 130° F. When another identical blend was prepared with the exception that the CPE content was 10.6 wt. %, it was rubbery at room temperature with good tack and did not pour even at temperatures above 140° F. Consequently, the proportion of CPE has a significant effect on the binder properties as shown in FIG. 3.

EXAMPLE 4

Figure 4:
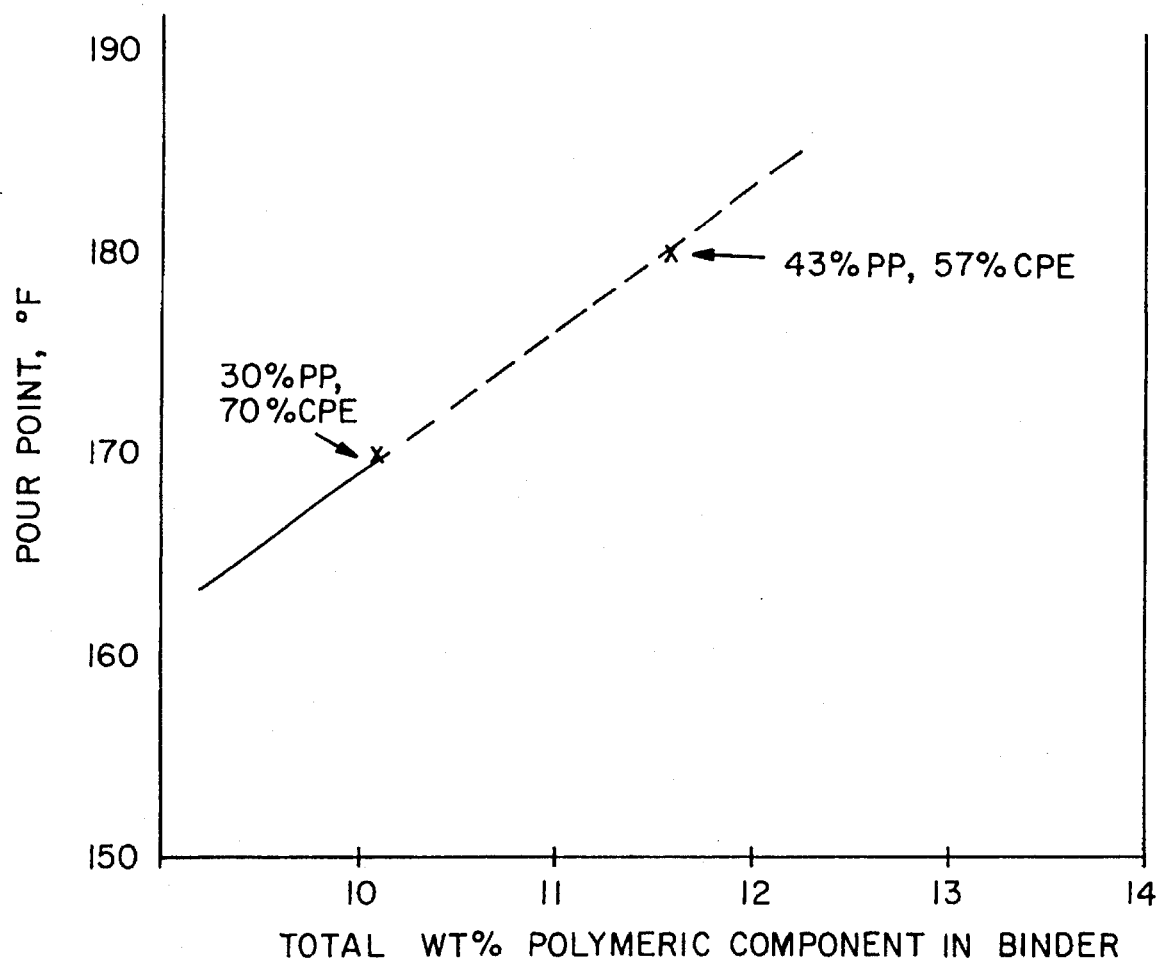
FIG. 4 is a graph showing the effect of the relative proportions of polypropylene and chlorinated polyethylene in binders on pour point. Dashed lines on the graph reflect extrapolation.

A blend was prepared by mixing 70% by volume of a first blend containing 10.6 wt. % of Dow Chemical's T-4211 chlorinated polyethylene and 89.4 wt. % Mobilsol® 90; with 30 volume % of a second blend containing 10 wt. % of Exxon's PD 5225 polypropylene in Mobilsol® 90. The resulting binder was rubbery with excellent tack and had a pour point in excess of 150° F. as shown in FIG. 4.

EXAMPLE 5

Five 200 g quantities of sand were heated to 180° C. while stirring. While continuing to stir, about 6.1–6.5 wt. % of a binder composition was added to each of the five samples of sand. These binder compositions were:

(a) A binder containing 10 wt. % of a polymer combination and 90 wt. % Mobilsol® 90. The polymer combination was a 60 wt. % of DPD 6169 EEA and 40 wt. % of ELVAX 250.

(b) A binder composition containing 10% of a polymer combination and 90% Mobilsol® 90. The polymer combination consisted of 55 wt. % of Exxon's PD5225 and 45 wt. % ELVAX 250.

(c) A binder containing 10.6 wt. % of Dow Chemical's T-4211 chlorinated polyethylene and 89.4 wt. % of Mobilsol® 90.

(d) A binder containing 11.3 wt. % of Dow Chemical's T-4211 chlorinated polyethylene and 88.7 wt. % Mobilsol® 90.

(e) A commercially produced sand/binder sold under the trade name EQUITRACK.

Each of the five samples were tested for compactability, heat stability, and rakeability. In testing for compactability, approximately 50% of the sand-binder mixture was placed in a one and one-half inch diameter closed-ended glass cylinder. The product was lightly tamped down and the pelletized, compacted material was removed. If this pelletized material did not bind together, compaction was deemed inadequate. The binder-sand pellets were then placed in sunlight for a period of 4 hours, during which time ambient temperatures ranged from 85° to 95° F. At the end of this period of exposure to sunlight, the temperature of the pellets just below the surface was measured as 143° F. Each pellet was then tested for clumping and rakeability.

The composition using binder (a) compacted well and did not lose its shape after exposure to sunlight. When the material was spread out, it was not excessively sticky and could be raked without clumping. This property did not change after cooling to 77° F.

The composition using binder (b) compacted well and the pellet did not lose its shape after exposure to sunlight. The material could be raked without clumping.

The composition including binder (c) showed very good compactability and held up well under heat. Under raking conditions while hot, the composition showed no tendency to clump.

The composition using binder (d) produced results similar to that of binder (c) except that the material compacted even firmer. The composition did not become excessively sticky under heat and raking did not cause clumping.

The composition using the commercial EQUITRACK binder showed good compactability at 77° F. However, the surface of the pellet became sticky upon heating in direct sunlight. When the material was spread out and raked, it showed a tendency to clump. The hot product also showed a tendency to stick to the rake. Upon cooling, clumps formed which did not break up upon further raking. The product was not as granular and free-flowing as it had been before testing.

From an analysis of these results, it is readily apparent that the invention product is superior to the currently commercially available product. The invention product is more stable under normal conditions of heating by direct sunlight and provides a rakeable, non-compacting cushion material eminently suitable for use as a racetrack surface composition. Binder levels of 5 wt. % or more may be used to obtain easy pad formation without significant loss of heat resistance; i.e., tendency to become soft which makes pad formation difficult.

EXAMPLE 6

Test for Rakeability

To test rakeability, a test was developed using a No. 4 U.S. standard mesh screen normally used for particle size analysis.

Approximately 200 g of the loose material to be tested is placed on the screen. The screen is then shaken in accordance with a standard practice for sieving by hand. This method involves shaking the sieve for a maximum of 50 shakes after which the amount of material that passes through is weighed. The shaking can, of course, be stopped at anytime when it is clear that substantially all of the material has passed through. The weight of the material passing through, as a percentage of the total weight, is the percent rakeability.

Rakeability may be scaled as follows: 0–25 wt %—unrakeable; 25–50 wt %—difficult to unrakeable; 50–65 wt % poor rakeability; 65–85 wt % good rakeability; and 85–100 wt % excellent rakeability. Depending upon the track, local weather and racing conditions and type of maintenance equipment used, a rakeability of from about 70 wt to 100 wt % is usually useful.

EXAMPLE 7

Comparative Tests on Lazy E Track Material

Synthetic racetrack material was prepared in a full-scale modified asphalt producing plant. A binder blend of 10% chlorinated polyethylene (CPE 3623A of Dow Chemical) in Mobilsol® 30 was prepared at 285° F. (141° C.). Sand was dried in a gas fired rotary kiln and the blend was added to the sand as it left the kiln's fire zone, at a rate of 4.5 wt. %. Due to poor temperature control of the blend and long residence time (more than 48 hours) in the heated blend tank, the binder-sand combination formed a "tight" racetrack composition with a measured rakeability of only 29% in some areas and up to 74% in others.

Tests were conducted on this "tight" (29% rakeability) composition to determine the effect of particular additives and the effect of water on the rakeability of the racetrack composition. Of the clays tested, Fuller's Earth and atapulgous clays are non-plastic aluminum magnesium silicates and bentonite is a plastic aluminum silicate. The rakeability test of Example 6 was used to test rakeability and the effect of water was tested as follows:

A 50 g sample of additive-doped material was placed in a flask to which was added 100 ml of distilled water. This mixture was shaken for 30 seconds and allowed to settle. Turbidity was checked to determine if the additive was leaching from the test sample. The supernatant water was then decanted and the procedure repeated twice more using 50 ml of water each time. The solids were then dried at 150° F. (66° C.) for 12 to 15 hours. Rakeability was then determined and is shown in the following table:

Rakeability of Additive-Doped Synthetic Racetrack Composition

| Additive | wt. % Doped | % Rakeability | % Rakeability After Wetting Test |
|---|---|---|---|
| Magnesium Silicate NYTAL 200 ™ | 3–5 | 91–95 | 91–95 |
| Calcium Sulfate (Gypsum) | 3–7 | 97–98 | 41 |
| Bauxite ($Al_2O_3.2H_2O$) | 5 | 0 | 0 |
| Fuller's Earth[1] | 5 | 96 | 93 |
| Bentonite Clay | 5 | 95 | 36 |
| Atapulgous Clay[2] | 5 | 97 | 88 |
| Fumed Silica (Cab-O-Sil ™) | 1.5 | 95 | 64 |
| Synthetic Calcium Silicate | 1.5 | 98 | 10 |
| $CaCO^3$ HUBERCARB M-200 ™ | 6 | 95 | 93 |

[1]38 wt % passes 200 U.S. mesh screen, median size 100 microns.
[2]54 wt % passes 200 U.S. mesh screen, median size 60 microns.
[3]In this sample, the binder was a lab prepared blend of 10 wt. % CPE 3623A in Mobilsol ® 30 doped at 5 wt. % onto sand.

EXAMPLE 8

Effect of Temperature of Rakeability

A binder was prepared with 10 wt % ELVAX 250 (ethylene vinyl acetate) in Mobilsol® 90. This binder is then blended into sand at rates of 6.1 wt % and 4.5 wt % binder to produce two race track compositions. These compositions were divided into two portions (each) and 5 wt % HUBERCARB M-200 was added to one of the divided portions. The four resultant compositions (A=6.1 wt % binder; B=6.1 wt % binder+5 wt % HUBERCARB M-200; C=4.5 wt % binder; D=4.5 wt % binder+5 wt % HUBERCARB M-200) were each tested to determine the effect of temperature and heating rakeability. The composition of the table of example 7 including HUBERCARB M-200 was also tested as sample E.

Samples were placed in an oven at 125° F. then cooled for one hour in a room temperature environment. Rakeability was measured. The samples were then further cooled for 16 hrs. Results were:

| Sample | % rakeability | |
|---|---|---|
| | 1 hr | 16 hrs |
| A | 25 | 67 |
| B | 43 | 73 |
| C | 15 | 61 |
| D | 46 | 89 |
| E | 95 | 95 |

The effect of temperature on rakeability was measured for each sample at 125° F., 82° F., and 70° F.

| Sample | % rakeability | | |
|---|---|---|---|
| | 125° F. | 82° F. | 70° F. |
| A | 86 | 16 | 77 |
| B | 94 | 43 | 82 |
| C | 93 | 20 | 59 |
| D | 96 | 46 | 79 |
| E | 95 | 95 | 95 |

These data demonstrate the improvements obtained by adding a small amount of a rakeability improving additive. However, in the "cool down" test samples B and D had poor rakeability (except for D after 16 hours) which could be improved by adding a higher proportion of the additive.

Note that sample A is an approximation to the composition of the Example in U.S. Pat. No. 4,792,133 and that this composition has inherently poor rakeability which is improved by the additive of the present invention.

EXAMPLE 9

Effect of Additive Particle Size

A calcium carbonate embodiment of the additive was used to test for the effect of particle size. Commercial calcium carbonates were used:

|  | Median Particle Size (microns) |
| --- | --- |
| HUBERCARB M-50 | 140 |
| HUBERCARB M-300 | 6.5 |
| HUBERCARB M-6 | 96% less than 7 |

Three Samples (I, II, III) of rakeability 74% were mixed with 4 wt % of M-50, M-300 and M-6 material, respectively and their resultant rakeabilities were measured:

| Sample | % rakeability |
| --- | --- |
| I | 92 (35 shakes) |
| II | 96 (6 shakes) |
| III | 96 (6 shakes) |

From the above, and the data on HUBERCARB M-200 in other examples, we conclude that finer particles (96% less than 7 microns) are marginally more effective than coarser particles (median 140 microns).

EXAMPLE 10

Load Bearing Test

To establish the ability of the race track compositions to bear loads, a test was devised. A sample of the composition to be tested was placed in a cylindrical mold: a PVC pipe of 1.3 inch inside diameter and 2.5 inch height. The mold is filled with the composition. The composition is then compressed up to about 30 psi, or any other pressure, as required. After compression, the cylindrical "pellet" in the mold is pushed out. The pellet is then placed under an end of a balanced beam which has a cup or container on top of the same end. Weights are then added to the container to cause the beam to swivel out of balance until the end above the pellet touches the pellet. Further weights are added until the pellet crumbles or collapses. This weight is the maximum load bearing capability of the composition.

Load bearing tests were carried out on the following compositions after being compacted at 30 psi and the results were:

| Sample | Composition of Binder | % Binder On Masonry Sand |
| --- | --- | --- |
| A | 10% ELVAX 250 in Mobilsol® 90 | 5 |
| B | 9.6% CPE 3623A in Mobilsol® 30 | 4.5 |
| C[1] | 10% CPE 3623A in Mobilsol® 30 | 4.5 |

[1]Average of various samples taken in a production run.

| Sample | T °F. at Compaction | T °F. Under Load | Load At Collapse, Grams |
| --- | --- | --- | --- |
| A | 77 | 77 | <150[1] |
| A | 110 | 77 | >500[2] |
| A | 110 | 125 | 130 |
| B | 77 | 77 | 250 |
| B | 110 | 77 | >500 |
| B | 110 | 125 | 210 |
| C[3] | 110 | 125 | 350->500 |

[1]Could not remove from mold, sample crumbled.
[2]Test limit is 500 g.
[3]Various samples tested on a production run gave a spread of readings.

A comparison of A with B at 77° F. under load shows the superior load bearing capability of the CPE-based blend over the EVA-based blend. When temperature at load increases to 125° F., the CPE-based blend is still superior to the EVA-based blend. Tests on production samples (C) confirm the superior performance of the CPE-based binder/sand combinations.

EXAMPLE 11

A Highly Rakeable Composition

A binder including 10.2 wt % CPE 3623A in MOBILSOL®30 was mixed at a rate of 4.8 wt % with masonry sand. The rakeability of this lab produced race track composition was 95%.

EXAMPLE 12

Effect of $CaCo_3$ on α-olefin binder—sand combinations

A binder was prepared with 15 wt % α-olefin No. 708 of Huls Chemische Werke (a terpolymer of ethylene, propylene and propene-1 with a melt viscosity of 8000 MPa at 190° C.) in a naphtenic oil. This binder was added to masonry sand at 4.8 wt %. Rakeability of this composition was tested at 0, 7 and 10 wt % addition of HUBERCARB M-200. Results were as follows:

| HUBERCARB M-200 (wt %) | % Rakeability |
| --- | --- |
| 0 | 15 |
| 7 | 78 |
| 10 | 95 |

EXAMPLE 13

Ultra-Violet Light Stability (Weatherability) of Binders

Test results indicate that CPE 3623A/Mobilsol®30 binders are 2–3 times more stable than a binder of 4.7% ELVAX 250 in Mobilsol® 90.

In conducting the weatherability test, a modification of the above-described load bearing test was used. A 1.5 lb. load was used to compact the sand and binder mixture into a test sample. The number of ¼" washers that caused the compacted sample to collapse was measured before and after exposure to a ultraviolet light source.

Exposure to ultraviolet light was carried out over a period of several weeks. The samples of binder and sand mixtures were placed in the cavities of an ordinary muffin pan to about ¾ fill the cavities. This material was then exposed to ultraviolet light and stirred five times per week. After exposure for several weeks, the modified load bearing test was run on each sample and results recorded.

The lower the number of washers needed to collapse the compacted sample, the greater the loss of cohesion of the binder relative to the pre-exposed sample. A reading of less than about 25 washers shows very low cohesion and failure of the material in this test.

The samples tested were as follows:

| Sample | Binder | % Binder On Masonry Sand |
|---|---|---|
| A | 10% ELVAX 250 in Mobilsol ® 90 (Lab Produced) | 4.7 |
| B | EQUITRACK Sample[1] (Commercial Production) | — |
| C | 10.5% CPE 3623A in Mobilsol ® 30 (Lab Produced) | 4.7 |
| D | 10% CPE 3623A in Mobilsol ® 30 (Commercial Production) | 4.5 |

[1]Taken from a Kentucky training track shortly after installation.

Load Bearing Test Results

| | | No. of Washes | |
|---|---|---|---|
| Sample | Exposure (Weeks) | Initial | After U.V. Exposure |
| A | 10 | 77 | 24 |
| B | 5 | 40 | 16 |
| B | 6 | 40 | 8 |
| C | 16 | 98 | 34 |
| C | 18 | 98 | 9 |
| D | 16 | 92 | 51 |

The invention has been described with reference to its preferred embodiments. From this description, a person of ordinary skill in the art may appreciate changes that could be made in the invention which do not depart form the scope and spirit of the invention as described above and claimed hereafter.

What is claimed:

1. A composition for racetrack surfaces comprising:
   (i) from about 2 to about 12 wt. % of a binder that does not pour readily at less than about 125° F., said binder comprising:
      (a) an oil-soluble polymer selected from the soluble copolymers of ethylene with vinyl acetate wherein the vinyl acetate content of the copolymer is from about 20 to about 30 wt. %;
      (b) an oil dispersible polymer selected from the oil dispersible copolymers of ethylene and propylene; and
      (c) a hydrocarbon oil, said oil being fluid at temperatures greater than about −25° F.; and
   (ii) particulate matter comprising sand; wherein the binder is mixed with the particulate matter to produce a composition that is capable of being compressed into a pad for a racetrack and also capable of being harrowed to form a rakeable cushion for a racetrack.

2. The composition of claim 1 wherein said oil-soluble polymer is from about 30 wt. % to about 70 wt. %, and said dispersible polymer is from about 70 wt. % to about 30 wt. % of the total weight of the polymers; the hydrocarbon oil is from about 85 wt. % to about 95 wt. % of the total weight of the polymers and the oil.

3. The composition of claim 1 further comprising a rakeability improving additive post-added to the composition, said additive being selected from fine naturally occurring, substantially water insoluble, heat stable minerals.

4. The composition of claim 3 wherein the additive is selected from the sulfates, silicates and carbonates of the alkaline earth elements.

5. The composition of claim 3 wherein the additive is a non-plastic clay.

6. The composition of claim 4 wherein the additive has an average particle size in the range about 1 to about 150 microns.

7. A composition useful for racetrack surfaces comprising:
   (i) from about 2 to about 12 wt. % of a binder that does not pour readily at less than about 130° F., said binder composition comprising:
      (a) an elastomeric polymer component comprising chlorinated polyethylene, styrene butadiene, ethylene propylene diene or mixtures thereof; and
      (b) a hydrocarbon oil, said oil being fluid at temperatures greater than about −25° F.; and
   (ii) particulate matter;
   wherein the binder is mixed with the particulate matter to produce a composition that is capable of being compressed into a pad for a racetrack and also capable of being harrowed to form a rakeable cushion for a racetrack.

8. The composition of claim 7 wherein said elastomeric polymer component is from about 3 wt. % to about 15 wt. %; the hydrocarbon oil is from about 85 wt. % to about 97 wt. % of the weight of the binder.

9. The composition of claim 7 further comprising a second non-elastomeric polymeric component comprising polypropylene.

10. The composition of claim 9 wherein said second non-elastomeric polymeric component is up to about 70 wt. % of the total weight of the polymers.

11. The composition of claim 7, wherein the elastomeric polymeric component comprises a mixture of elastomers.

12. The composition of claim 7 further comprising a rakeability improving additive post-added to the composition, said additive being selected from fine naturally occurring, substantially water insoluble, heat stable minerals.

13. The composition of claim 12 wherein the additive is selected from the sulfates, silicates and carbonates of the alkaline earth elements.

14. The composition of claim 13 wherein the additive has an average particle size in the range about 1 to about 150 microns.

15. The composition of claim 12 wherein the additive is a non-plastic clay.

16. The binder of claim 1 further comprising about 0.2 to about 2.0 wt. % carbon black.

17. The binder of claim 3 further comprising about 0.2 to about 2.0 wt. % carbon black.

18. The binder of claim 7 further comprising about 0.2 to about 2.0 wt. % carbon black.

19. The binder of claim 12 further comprising about 0.2 to about 2.0 wt. % carbon black.

* * * * *